(12) United States Patent
Wang et al.

(10) Patent No.: US 8,787,324 B2
(45) Date of Patent: Jul. 22, 2014

(54) SCHEDULING AND PROTECTION OF QUIET PERIODS IN A QUIET ZONE FOR INCUMBENT SIGNAL DETECTION

(75) Inventors: Jianfeng Wang, Ossining, NY (US); Vasanth Gaddam, Tarrytown, NY (US)

(73) Assignee: Koninklijke Philips N.V., Eindhoven (NL)

(*) Notice: Subject to any disclaimer, the term of this patent is extended or adjusted under 35 U.S.C. 154(b) by 182 days.

(21) Appl. No.: 13/201,654

(22) PCT Filed: Feb. 2, 2010

(86) PCT No.: PCT/IB2010/050442
§ 371 (c)(1),
(2), (4) Date: Aug. 16, 2011

(87) PCT Pub. No.: WO2010/097722
PCT Pub. Date: Sep. 2, 2010

(65) Prior Publication Data
US 2011/0299509 A1    Dec. 8, 2011

Related U.S. Application Data

(60) Provisional application No. 61/156,099, filed on Feb. 27, 2009.

(51) Int. Cl.
*H04W 72/12* (2009.01)

(52) U.S. Cl.
USPC .......................................................... 370/336

(58) Field of Classification Search
USPC ......... 370/328, 329, 336, 345, 498, 348, 351, 370/254, 431
See application file for complete search history.

(56) References Cited

U.S. PATENT DOCUMENTS 8,155,033 B2* 4/2012 Chaudhri et al. ............. 370/278
8,155,649 B2* 4/2012 McHenry et al. ............. 455/434
(Continued)

FOREIGN PATENT DOCUMENTS

EP         1914942 A1    4/2008
WO    WO2008090509 A2    7/2008

OTHER PUBLICATIONS

IEEE Standard for Information Technology—Telecommunications and information exchange between systems—IEEE Std 802.11-2007, IEEE Computer Society, Jun. 12, 2007.*

(Continued)

*Primary Examiner* — Mark Rinehart
*Assistant Examiner* — Peter Solinsky
(74) *Attorney, Agent, or Firm* — Larry Liberchuk

(57) ABSTRACT

A method and system for scheduling and protecting quiet periods (QP) in a quiet zone (105) for incumbent signal (121) detection in a wireless communications system. The communication system includes a plurality of wireless networks (103, 104), each of the plurality of wireless networks contains at least a master device (101, 401) and a client device (111, 411). In each of the plurality of wireless networks, the master device (101, 401) transmits a beacon (402) that contains a QP schedule (500) and a reservation of a time slot (405) for the client device (411). The client device (111, 411) transmits a request-to-quiet (RTQ) message (412) during the time slot, wherein the RTQ message (412) includes the client device's QP schedule information. The master and client devices within the quiet zone (105) keep quiet during scheduled quiet periods according to the QP schedule information contained in the received beacons and RTQ messages.

20 Claims, 6 Drawing Sheets

(56) References Cited

U.S. PATENT DOCUMENTS

| | | | |
|---|---|---|---|
| 8,320,308 B2* | 11/2012 | Hu | 370/329 |
| 2006/0128402 A1 | 6/2006 | Lee et al. | |
| 2007/0248076 A1* | 10/2007 | Ji et al. | 370/350 |
| 2008/0112350 A1* | 5/2008 | Nanda et al. | 370/312 |
| 2009/0016293 A1* | 1/2009 | Kang et al. | 370/329 |
| 2009/0067448 A1* | 3/2009 | Stanwood et al. | 370/447 |
| 2009/0147741 A1* | 6/2009 | Hu | 370/329 |
| 2009/0225742 A1* | 9/2009 | Chu et al. | 370/349 |
| 2009/0268619 A1* | 10/2009 | Dain et al. | 370/252 |
| 2009/0303930 A1* | 12/2009 | Ashley | 370/328 |
| 2010/0020732 A1* | 1/2010 | Gaddam et al. | 370/310 |
| 2010/0075704 A1* | 3/2010 | McHenry et al. | 455/509 |
| 2010/0173586 A1* | 7/2010 | McHenry et al. | 455/62 |
| 2010/0203914 A1* | 8/2010 | Shan et al. | 455/509 |
| 2010/0226358 A1* | 9/2010 | Cordeiro | 370/350 |
| 2010/0246442 A1* | 9/2010 | Wang et al. | 370/254 |
| 2010/0246444 A1* | 9/2010 | Witzel et al. | 370/255 |
| 2010/0304772 A1* | 12/2010 | Wang et al. | 455/509 |
| 2012/0039183 A1* | 2/2012 | Barbieri et al. | 370/241.1 |
| 2012/0039284 A1* | 2/2012 | Barbieri et al. | 370/329 |
| 2012/0071189 A1* | 3/2012 | Mody | 455/513 |
| 2012/0230491 A1* | 9/2012 | Duo et al. | 380/270 |
| 2012/0320741 A1* | 12/2012 | Freda et al. | 370/229 |
| 2012/0327919 A1* | 12/2012 | Benveniste | 370/338 |

OTHER PUBLICATIONS

IEEE Std 802.11-2007.*

Carlos Cordeiro et al., "IEEE 802.22: An Introduction to the First Wireless Standard based on Cognitive Radios", Internet Citation, Apr. 1, 2006, pp. 38-47, XP002487308 http://www.academypublisher.com/jcm/vo101/no01/jcm01013847.pdf.

Carlos Cordeiro et al., "C-MAC: A Cognitive MAC Protocol for Multi-Channel Wireless Networks" New Frontiers in Dynamic Spectrum Access Networks, 2007. DYSPAN 2007. 2nd IEEE International Symposium on, IEEE, Pl, Apr. 1, 2007, pp. 147-157, XP031095614.

* cited by examiner

SCHEDULING AND PROTECTION OF QUIET PERIODS IN A QUIET ZONE FOR INCUMBENT SIGNAL DETECTION

This application claims the benefit of U.S. Provisional Application No. 61/156,099 filed on Feb. 27, 2009.

The invention generally relates to devices in a network operating in the TV (television) bands and, more particularly, to a method and system which provides a mechanism to silence neighboring devices around a client device that is performing an incumbent signal detection in an IEEE 802.11 based system.

The FCC (Federal Communications Commission) has recently approved the rules for unlicensed use of the TV band. The TV band is good for propagation and can be widely available, especially in rural areas. This opens up enormous opportunities for innovative services, such as broadband internet access, home multimedia distribution, mesh networking, smart metering, and building automation and control.

Many widely adopted and deployed standards, including IEEE 802.11 and IEEE 802.15, are working towards taking advantage of such unlicensed spectrum by adapting physical (PHY) layer and media access control (MAC) layer, mainly to meet regulatory requirements to protect the primary users, such as TV station and wireless microphone, among others.

Under the FCC rule, both geo-location/database and sensing should be implemented to determine the channel availability of a network. The master device in a network (e.g. Access Point (AP) in WiFi case) should have a geo-location/database, accessed via the Internet, to determine the channel availability. In addition, every device, including the master device, needs to sense the operating channel regularly. Once a primary user (incumbent device) is detected, the sensing result should be reported to the master device and actions should be taken accordingly (coordinated by the master device), e.g., vacating the channel if a low power primary user, such as a wireless microphone, has been detected.

Therefore, sensing reliability in terms of a low false alarm rate and a low missed detection rate is a key to making the most out of the available spectrum while protecting potential primary users. Given the extreme low detection threshold (as low as −114 dBm) required by the FCC regulation, it is not straightforward to achieve high sensing reliability. To allow a device to sense reliably, the neighboring secondary devices within a certain distance, called a quiet zone 105 (FIG. 1), should keep silent during the detection time. Such a period, in which every device keeps silent, is termed a quiet period (QP). The neighboring devices being silent could be devices belonging to other networks, and the devices that are outside the transmission range of a home AP.

The IEEE 802.11h standard provides a method to schedule quiet intervals or periods to enable a reliable sensing of a radar signal in the same 5 GHz frequency band. The AP in a Basic Service Set (BSS) schedules quiet intervals by transmitting one or more quiet elements in beacon frames and probe response frames. While this method is sufficient for such a system, it cannot be simply applied to the TV white space due to a much stricter sensing requirement in the TV bands in order to protect primary users in the TV bands. First, every device is required to carry out sensing, and the sensing result of one device may apply to the whole network. Second, the sensing requirement is much stricter in terms of sensitivity. To achieve such a sensing requirement, the quiet zone for the device carrying out the measurement should be large enough and the contiguous quiet period should be long enough (for example, greater than or equal to 5 ms). It is also preferred that a quiet period should be synchronized across each quiet zone, because of a larger quiet zone and a lesser quiet period overhead for performing a sensing operation.

Other existing MACs are reservation based, which makes the QP scheduling relatively easier. However, they are not suitable for the contention based IEEE 802.11 protocol, and they lack sufficient mechanisms to protect sensing devices from interference by neighboring secondary devices.

Certain embodiments of the present invention provide a mechanism to silence neighboring devices around a client device that is performing an incumbent signal detection in an IEEE 802.11 based system. Therefore, the reliability of the incumbent signal detection can be significantly improved. According to certain embodiments of the invention, disclosed are time diagram, essential messages, procedures and algorithms to schedule a QP across neighboring networks for IEEE 802.11 based systems, in which channel access is contention based and neighboring networks are not synchronized. Certain embodiments of this invention also propose methods to resolve collisions between quiet periods and the beacon transmission time of a neighboring network. Also, certain embodiments of this invention allow a secondary device to identify and remove unreliable sensing results from sensing result consolidation. As a result, the false alarm of primary detection could be significantly reduced.

In an embodiment of the invention, a method and system is provided for scheduling and protection of quiet periods (QP) in a quiet zone for incumbent signal detection in a wireless communications system, including a plurality of wireless networks, where each of the plurality of wireless networks contains at least a master device and a client device. In each of the plurality of wireless networks, the master device transmits a beacon containing a QP schedule and a reservation of a time slot for the client device; the client device transmits a request-to-quiet (RTQ) message during the reserved time slot, wherein the RTQ message comprises QP schedule information; and all the master and client devices within the quiet zone keep quiet during scheduled quiet periods according to the QP schedule information contained in all received beacons and RTQ messages from the plurality of wireless networks.

In another embodiment of the invention, methods to resolve collisions between quiet periods and the beacon transmission time of a neighboring network are provided. In one method, the QP schedule is adjusted according to a targeted beacon transmission time (TBTT) of another one of the plurality of wireless networks in order to avoid a collision between the scheduled quiet periods and beacon transmissions by the other one of the plurality of wireless networks. The master and client devices report and update the TBTT by listening to beacon transmissions from the other one of the plurality of wireless networks. In another method, the master device transmits a decline-to-quiet message to a device of another one of the plurality of wireless networks that transmits a beacon or RTQ if there is a collision between the scheduled quiet periods and the master device's beacon transmissions; and the device that transmits the beacon or RTQ responds to the decline-to-quiet message with a respond-to-decline message, adjusts the QP schedule to avoid the collision, and issues a new QP schedule in a beacon or RTQ message.

The subject matter that is regarded as the invention is particularly pointed out and distinctly claimed in the claims at the conclusion of the specification. The foregoing and other features and advantages of the invention will be apparent from the following detailed description taken in conjunction with the accompanying drawings.

Figure 1:
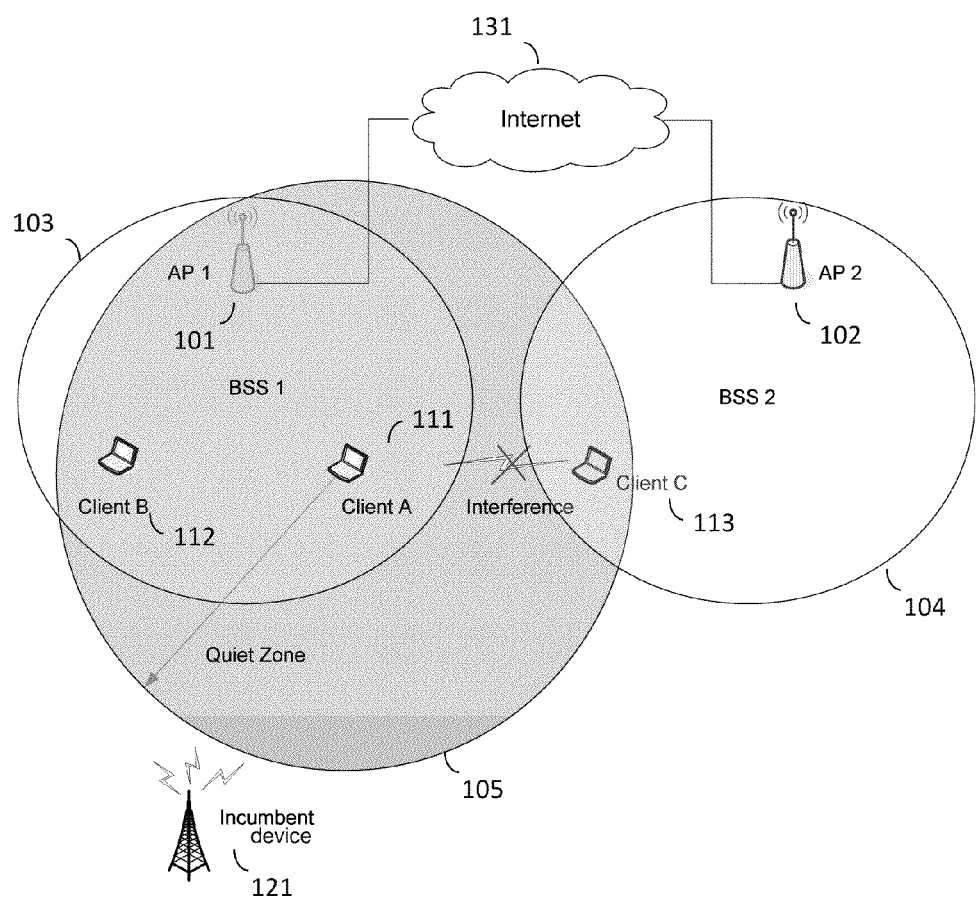
FIG. 1 illustrates an incumbent signal detection and a Quiet Zone.

It is important to note that the embodiments disclosed by the invention are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in plural and vice-versa with no loss of generality. In the drawings, like numerals refer to like parts through several views.

According to the FCC rules, every device in a network intending to operate in TV bands should be able to reliably detect incumbent TV and wireless microphone signals as low as −114 dBm. Given the existing IEEE 802.11 protocols, a client device cannot achieve reliable sensing, among others, primarily due to being subject to interference from neighboring devices during the time of performing the incumbent signal sensing. For example, as shown in FIG. 1, an AP is able to regularly schedule the QP according to the current protocols, which is, however, limited to its own BSS. AP1 101 schedules the QP with client A 111 and Client B 112 within its BSS1 103. Although AP1 101 and AP2 102 can communicate via the Internet 131, AP2 102 schedules the QP with Client C 113 within its own BSS2 104, independent of AP1 101. Thus, while sensing for an incumbent signal from an incumbent device 121, Client A 111 is still vulnerable to interference from Client C 113, because Client C could be not aware of the QP schedule set by AP1 101.

Figure 2:
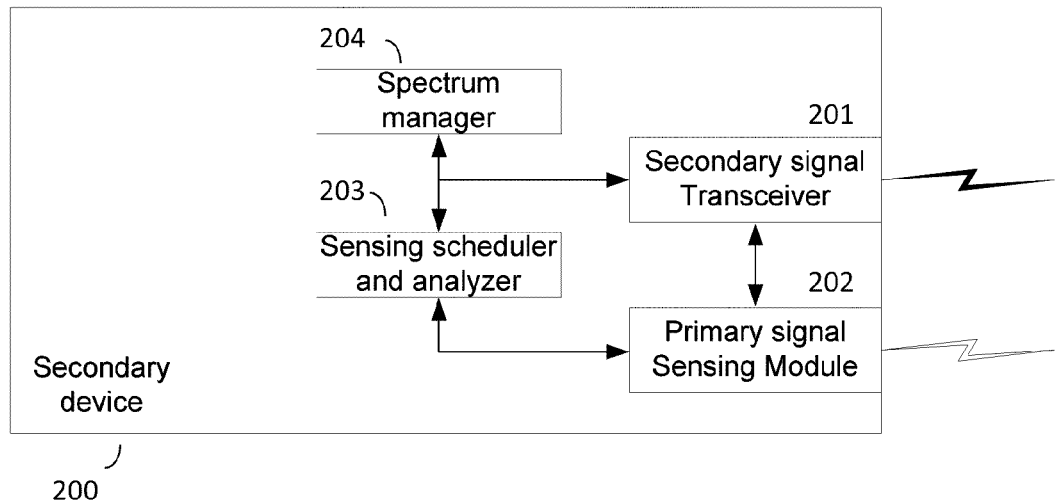
FIG. 2 illustrates a block diagram of a secondary device according to an embodiment of the invention.
Figure 3:
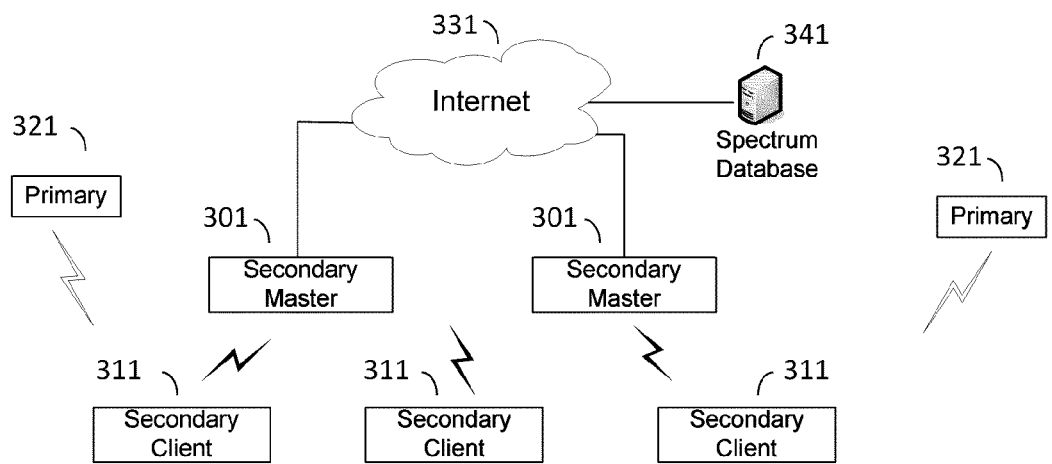
FIG. 3 illustrates a determination of spectrum availability by secondary devices in accordance with an embodiment of the present invention.

FIG. 2 illustrates a block diagram of a secondary device 200 according to an embodiment of the invention. A secondary device 200 includes a secondary signal transceiver 201, a primary signal sensing module 202, a sensing scheduler and analyzer 203, and a spectrum manager 204. The secondary signal transceiver 201 is responsible for the processing, transmission, and reception of wireless signals among secondary devices. The secondary signal transceiver 201 normally further includes a physical layer PHY processor and a MAC processor. The primary signal sensing module 202 is responsible for detecting a primary signal. The sensing scheduler and analyzer 203 decides when sensing is conducted and how the sensing results are consolidated (with inputs of both the primary signal sensing module 202 and the secondary signal transceiver 201). The spectrum manager 204 selects or deselects an operating frequency channel for secondary devices according to the spectrum availability. As shown in FIG. 3, the spectrum availability in one embodiment is determined by spectrum sensing and a spectrum database. A secondary master device 301 can access a spectrum database 341 over the Internet 331 through a network interface, and can sense signals from a primary device 321. For a secondary client device, the spectrum availability is normally determined by spectrum sensing of primary devices 321 as well as the signaling received from its associated secondary master device 301.

Figure 4:
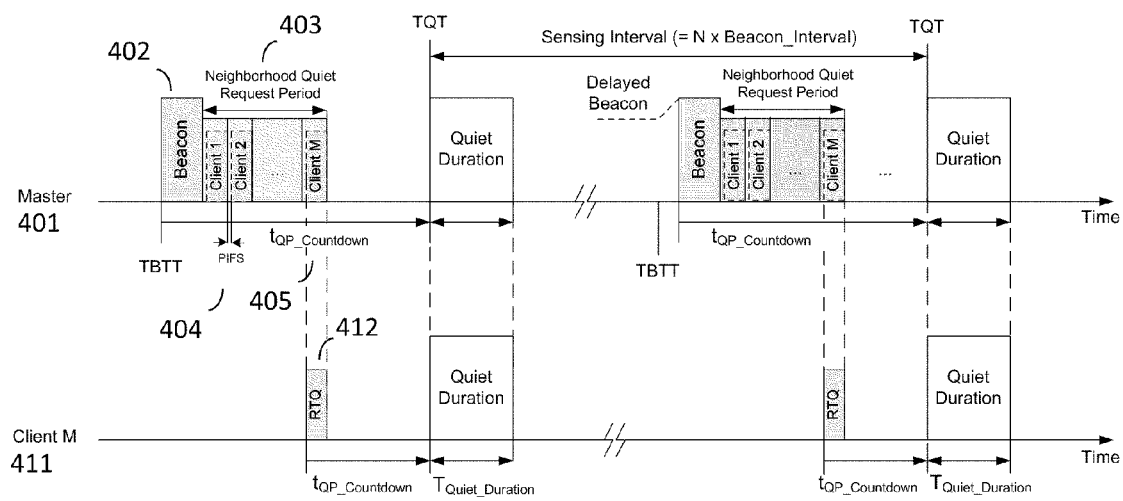
FIG. 4 illustrates a timing diagram of a QP (Quiet Period) schedule in accordance with an embodiment of the present invention.

In an embodiment of the invention, the master device in a network coordinates a QP schedule of its own network. The QP may be regularly scheduled. FIG. 4 illustrates the time diagram of the QP schedule relative to a beacon transmission. A master 401 disseminates the QP scheduling information through its beacon 402. To help each client device create its own quiet zone, the master device reserves a contention-free period, called the neighborhood quiet request period (NQRP) 403, immediately following its beacon 402 for client devices to transmit management message to quiet neighboring devices. As shown in FIG. 4, the NQRP 403 is divided into multiple slots, with slot size TRTQ_Slot. Each slot 405 allows one client 411 to send a Request-to-Quiet (RTQ) management message 412. The inter frame space between RTQ frames (and between beacon and the first following RTQ) should be small enough so that a client device can capture a channel with high priority after a beacon transmission (necessary for an uncoordinated distributed environment). For example, the inter frame space can be set to priority or PCF interframe space (PIFS) 404.

Figure 5:
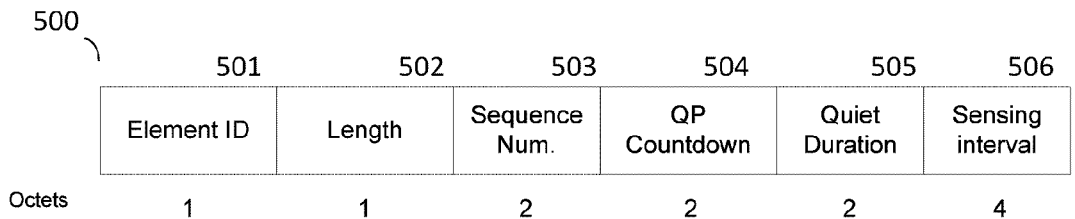
FIG. 5 illustrates an Information element of a QP schedule in accordance with an embodiment of the present invention.

The master device carries the information element describing a neighborhood quiet request period in its beacon. As shown in FIG. 5, the QP scheduling information element 500 includes an element ID 501, a length 502, a sequence number 503, a beginning time of the next QP (QP_Countdown) 504, a duration of the QP (Quiet Duration) 505, and an interval between QPs (Sensing Interval) 506. The minimum Quiet Duration depends on sensing algorithms. For example, one sensing algorithm requires at least 5 ms for each quiet period. The sensing interval is normally N (N>=1, integer) times the beacon interval. However, if a sensing interval is set to 0, the following QP is scheduled only once (without repetition). For a regular QP schedule, to increase the reliability of the QP schedule information broadcast, a quiet element (contained in a beacon) and RTQs are transmitted in each beacon interval (although the sensing interval could be multiple times of the beacon interval). The information element of the quiet schedule includes a sequence number 503 to indicate the freshness of the quiet schedule.

Figure 6:
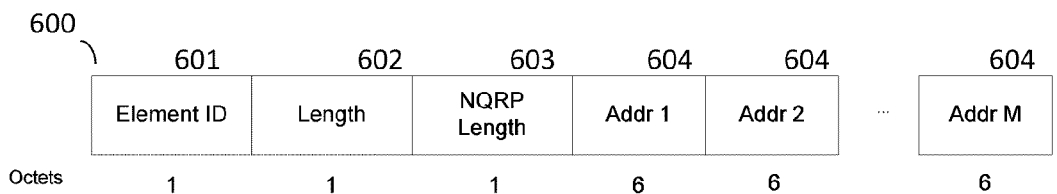
FIG. 6 illustrates an Information element of a neighborhood quiet request period (NQRP) in accordance with an embodiment of the present invention.

The format of the NQRP information element is illustrated in FIG. 6. The NQRP information element 600 includes an element ID 601, a length 602, a NQRP length 603, and an address list 604. The address list 604 in the NQRP information element specifies a group of devices chosen for participating in a quiet zone setting and the order to transmit an RTQ within the neighborhood quiet request period. Normally, the NQRP is long enough so that each device in the network would be selected to transmit an RTQ in each NQRP. However, the number of associated devices could be very large, and the NQRP needs to be kept relatively short to save overhead. In this case, only a subgroup of client devices will be selected in each NQRP, and the list of a subgroup can be rotated from NQRP to NQRP. Each client device would be given an equal opportunity to send its RTQ. More opportunities may be assigned to those in need, for example, those involving collisions during sensing. In addition to sending its RTQ in a NQRP (which gives clients higher chances to send an RTQ without collisions), a client may also send an RTQ on demand outside NQRP.

Figure 7:
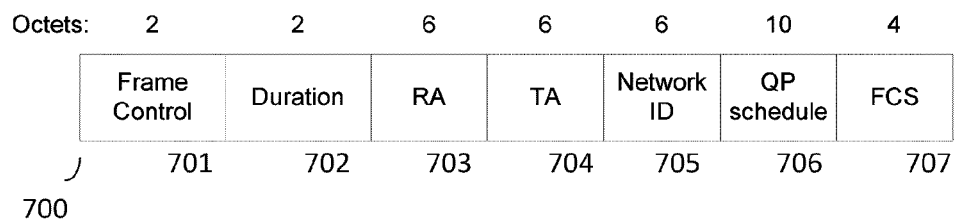
FIG. 7 illustrates a RTQ (Request-to-Quiet) message format in accordance with an embodiment of the present invention.

The RTQ contains similar QP scheduling information as explained above (FIG. 5), i.e., adjusted QP Countdown, Quiet Duration, and Sensing Interval. The RTQ may be transmitted in the most robust modulation and coding scheme allowed in the system, so that it can reach as far as possible. The format of the RTQ is illustrated in FIG. 7. The RTQ 700 includes a frame control 701 and duration 702. The RA 703 is the receiver address of the RTQ, set to be the broadcast address. The TA 704 is the transmitter device address. FIG. 7 also shows a Network ID 705 of the transmission device, e.g., BSSID (basic service ID). The QP schedule field 706 contains the QP scheduling information, as explained above. A frame check sequence (FCS) 707 is also provided.

A neighboring device receiving an RTQ or beacon (from a neighbor network) should keep quiet during the scheduled period. A device may receive multiple RTQs from the same neighbor network or from different neighboring networks. The QP schedule may differ among networks. A device in the neighborhood of multiple networks should protect each QP and keep silent during each QP. With the Network ID and sequence number (included in the QP schedule), a neighboring device can uniquely identify to which network the received QP schedule belongs and whether the QP schedule is up-to-date.

It could happen that the device receiving a RTQ is a neighbor master device, and the scheduled quiet time of the neighbor network collides with the beacon transmission time of its own network. Such collision should be avoided since the regular beacon transmission is very important for the proper operation of a network. Several ways can prevent such collision from happening. In an embodiment of the invention, proactively, if a master knows the TBTT (targeted beacon transmission time) of a neighbor network, the master should adjust its QP schedule to avoid collision. In doing so, a device overhearing beacons from a new neighbor network should report and update the TBTT of the neighboring network to its own master device.

Figure 8:
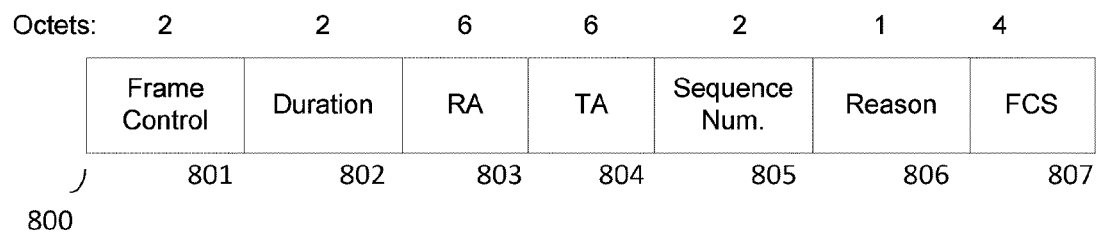
FIG. 8 illustrates a DTQ (Decline-to-Quiet) message format in accordance with an embodiment of the present invention.
Figure 9:
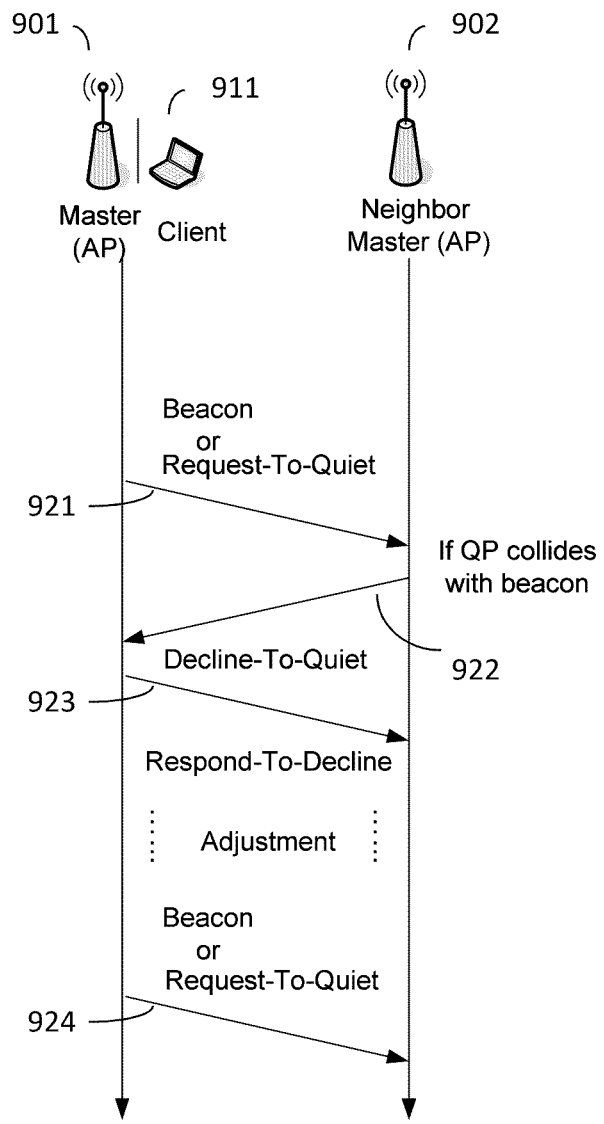
FIG. 9 illustrates a message flow between a master or client device with a neighboring master device.

If a collision happens, the master device receiving a RTQ or beacon from its neighbor network should decline such a schedule by sending a Decline-To-Quiet (DTQ) message which indicates the reason for decline as "beacon collision." FIG. 8 shows the format of a DTQ message 800, which includes a frame control 801, a duration 802, a receiver address (RA) 803, a transmitter address (TA) 804, a sequence number 805, a reason 806 and a frame check sequence (FCS) 807. FIG. 9 shows a message flow between a master device 901 or client device 911 and a neighbor master device 902 according to an embodiment of the invention. A beacon or RTQ 921 containing the QP scheduling information is sent from the master device 901 or the client device 911. Neighbor master device 902 receives the beacon or RTQ, and keeps quiet during the scheduled QP if there is no collision with its own beacons. As discussed above, if a collision happens, the neighbor master device 902 receiving a RTQ or beacon 921 declines such schedule by sending a DTQ message 922, which indicates the reason for decline as "beacon collision." The RA (receiver address) of the DTQ message is set to the address from which the collided QP schedule is received (either by RTQ or beacon). The sequence number in DTQ 922 corresponds to that of the QP schedule in the received RTQ 921. After receiving the corresponding DTQ 922, the device sending the RTQ 921 replies with a response-to-decline message 923 and requests to change the QP schedule. Then, the master device 901 or the client device 911, requested to change the quiet period schedule, will issue a new QP schedule 924.

Even with the above QP scheduling mechanism, sensing could be still subject to interference from a neighbor device, for example, due to the fact that a neighbor device may miss the RTQ. To further enhance the reliability of sensing, in an embodiment of the invention, a mechanism identifies and removes the tainted measurement of primary signal from the sensing result consolidation. For example, a secondary device may decode a neighboring secondary signal (a preamble or packet header or whole packet) and at the same time perform a primary signal detection. As shown in FIG. 2, the sensing analyzer 203 gets input from both primary signal sensing module 202 and secondary signal transceiver 201 to decide whether the primary sensing is valid. If the secondary signal is identified during a measurement period, the measurement result during the measurement period should be singled out. If the aggregated sensing time is long enough, a secondary device can still get enough clean sensing results for decision making from a portion of sensing results. For example, a reliable sensing requires 8 measurements within a 60-second period (regulatory requirement for in-service monitoring), where each measurement takes 5 ms. The master can schedule 16 quiet periods within the 60-second period for measurement, each lasting 5 ms. If a secondary signal is detected during a certain measurement of the primary signal, that measurement will be marked as unreliable/invalid and will not be used for the sensing result consolidation. Therefore, even if half of the measurements are tainted with interference from the neighboring devices, a device is still able to make a correct sensing decision. By doing so, false alarms may be reduced.

Figure 10:
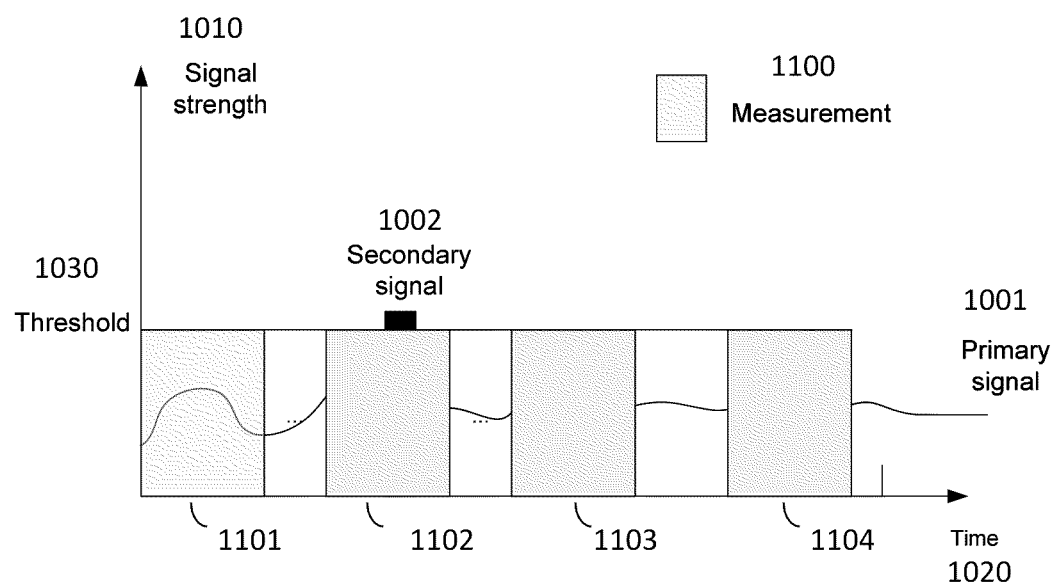
FIG. 10 illustrates a singling out of a primary measurement tainted by a secondary signal in accordance with an embodiment of the present invention.

An example is illustrated in FIG. 10. Measurement 1100 measures the signal strength 1010 as a function of time 1020 for the primary signal 1001. Four measurements 1101, 1102, 1103 and 1104 are made. A detection threshold 1030 is set for the measurements. A secondary signal 1002 is detected during the measurement 1102. Therefore, measurement 1102 will be marked as unreliable/invalid and will not be used for the sensing result consolidation.

This invention is applicable to, for example, IEEE 802.11, IEEE 802.15 and Ecma TC48-TG1 standards.

The foregoing detailed description has set forth a few of the many forms that the invention can take. It is intended that the foregoing detailed description be understood as an illustration of selected forms that the invention can take and not as a limitation to the definition of the invention. It is only the claims, including all equivalents that are intended to define the scope of this invention.

Most preferably, the principles of the invention are implemented as any combination of hardware, firmware and software. Moreover, the software is preferably implemented as an application program tangibly embodied on a program storage unit or computer readable storage medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit.

What is claimed is:

1. A method for scheduling and protecting quiet periods (QP) in a quiet zone in order to detect an incumbent signal in a wireless communications system that includes a plurality of wireless networks, each of the plurality of wireless networks containing at least a master device and a client device, the method comprising:
   transmitting a beacon by a master device of one of the plurality of wireless networks, wherein the beacon contains a first QP schedule and a reservation of a time slot for a client device of the one of the plurality of wireless networks;
   transmitting a request-to-quiet (RTQ) message by the client device of the one of the plurality of wireless networks during the time slot, wherein the RTQ message includes a second QP schedule; and
   keeping quiet by the master device and the client device of each of the plurality of wireless networks within the quiet zone during quiet periods according to information in the first and second QP schedules;
   wherein the incumbent signal is transmitted by a primary user device; and
   wherein the master and client devices are secondary user devices.

2. The method of claim 1, further comprising adjusting the first or second QP schedule according to a targeted beacon transmission time (TBTT) of another one of the plurality of wireless networks in order to avoid a collision between the quiet periods and beacon transmissions by the other one of the plurality of wireless networks.

3. The method of claim 2, further comprising reporting and updating the TBTT by listening to beacon transmissions from the other one of the plurality of wireless networks.

4. The method of claim 1, further comprising
   transmitting a decline-to-quiet (DTQ) message by a master device of another one of the plurality of wireless networks if there is a collision between the quiet periods and beacon transmissions by the other one of the plurality of wireless networks;
   responding to the DTQ message with a respond-to-decline message;
   adjusting the first or second QP schedule to avoid the collision; and
   issuing a new QP schedule in the beacon or the RTQ message.

5. The method of claim 1, wherein the reserved time slot is a time slot in a neighborhood quiet request period (NQRP) immediately following the beacon, and the master device of the one of the plurality of wireless networks includes a NQRP information element in the beacon for time slot reservations for the client device of the one of the plurality of wireless networks, wherein the NQRP information element comprises an address list specifying a group of devices chosen for participating in a quiet zone to transmit the RTQ message within the neighborhood quiet request period.

6. The method of claim 1, further comprising:
   detecting an incumbent signal by making a plurality of measurements during the quiet periods; and
   discarding a measurement of the plurality of measurements if another signal is detected during the measurement.

7. A system for detecting an incumbent signal of a wireless communications medium, the system including a plurality of wireless networks, each of the plurality of wireless networks containing at least a master device and a client device, the system comprising:
   a master device of one of the plurality of wireless networks configured to transmit a beacon, the beacon containing a first quiet period (QP) schedule and a reservation of a time slot for a client device of the one of the plurality of wireless networks, the client device of the one of the plurality of wireless networks being configured to transmit a request-to-quiet (RTQ) message during the time slot, wherein the RTQ message includes a second QP schedule, and wherein master and client devices of each of the plurality of wireless networks within a quiet zone are configured to keep quiet during quiet periods according to information in the first and second QP schedule;
   wherein the incumbent signal is transmitted by a primary user device; and
   wherein the master and client devices are secondary user devices.

8. The system of claim 7, wherein the master device of the one of the plurality of wireless networks is further configured to:
   adjust the first or second QP schedule according to a targeted beacon transmission time (TBTT) of another one of the plurality of wireless networks in order to avoid a collision between the quiet periods and beacon transmissions by the other one of the plurality of wireless networks.

9. The system of claim 8, wherein the master and client devices of the one of the plurality of wireless networks are further configured to:
   report and update the TBTT by listening to beacon transmissions from the other one of the plurality of wireless networks.

10. The system of claim 7, wherein a master device of another one of the plurality of wireless networks is further configured to:
    transmit a decline-to-quiet (DTQ) message to the device of the one of the plurality of wireless networks that transmits the beacon or the RTQ message if there is a collision between the quiet periods and the beacon of the master device of the other one of the plurality of wireless networks; and
    the device that transmits the beacon or the RTQ message is further configured to:
    respond to the DTQ message with a respond-to-decline message;
    adjust the first or second QP schedule to avoid the collision; and
    issue a new QP schedule in the beacon or the RTQ message.

11. The system of claim 7, wherein the reserved time slot is a time slot in a neighborhood quiet request period (NQRP) immediately following the beacon, and the master device of the one of the plurality of wireless networks is further configured to include a NQRP information element in the beacon for time slot reservations for the client device of the one of the plurality of wireless networks, and wherein the NQRP information element comprises:
    an address list specifying a group of devices chosen for participating in the quiet zone to transmit the RTQ message within the neighborhood quiet request period.

12. The system of claim 7, wherein each of the master and client devices further comprises:
    a spectrum manager for selecting or deselecting an operating frequency channel;
    a primary signal sensing module for detecting an incumbent signal;

a secondary signal transceiver for receiving signals from the plurality of wireless networks; and a sensing scheduler and analyzer for scheduling a plurality of signal measurements during the quiet periods and discarding a measurement of the plurality of measurements if another signal is detected during the measurement.

13. The system of claim 12, wherein each master device of the plurality of wireless networks further comprises a means for accessing a spectrum database over the Internet.

14. The system of claim 13, wherein the spectrum manager selects or deselects an operating frequency channel based on consolidated signal measurements from devices of the plurality of wireless networks and the spectrum database.

15. A non-transitory computer readable storage medium having stored thereon computer executable code, that when executed, causing a processor to perform a process of scheduling and protecting quiet periods (QP) in a quiet zone in order to detect an incumbent signal in a wireless communications system that includes a plurality of wireless networks, each of the plurality of wireless networks containing at least a master device and a client device, the process comprising:

transmitting a beacon by a master device of one of the plurality of wireless networks, wherein the beacon contains a first QP schedule and a reservation of a time slot for a client device of the one of the plurality of wireless networks;

transmitting a request-to-quiet (RTQ) message by the client device of the one of the plurality of wireless networks during the time slot, wherein the RTQ message comprises a second QP schedule; and keeping quiet by master and client devices of each of the plurality of wireless networks within the quiet zone during quiet periods according to information in the first and second QP schedule;

wherein the incumbent signal is transmitted by a primary user device; and wherein the master and client devices are secondary user devices.

16. The non-transitory computer readable storage medium of claim 15, wherein the process further comprises:

adjusting the first or second QP schedule according to a targeted beacon transmission time (TBTT) of another one of the plurality of wireless networks in order to avoid a collision between the quiet periods and beacon transmissions by the other one of the plurality of wireless networks.

17. The non-transitory computer readable storage medium of claim 16, wherein the process further comprises:

reporting and updating the TBTT by listening to beacon transmissions from the other one of the plurality of wireless networks.

18. The non-transitory computer readable storage medium of claim 15, wherein the process further comprises:

transmitting a decline-to-quiet (DTQ) message by a master device of another one of the plurality of wireless networks if there is a collision between the quiet periods and beacon transmissions by the other one of the plurality of wireless networks;

responding to the DTQ message with a respond-to-decline message;

adjusting the first or second QP schedule to avoid the collision; and issuing a new QP schedule in the beacon or the RTQ message.

19. The non-transitory computer readable storage medium of claim 15, wherein the reserved time slot is a time slot in a neighborhood quiet request period (NQRP) immediately following the beacon, and the master device of the one of the plurality of wireless networks includes a NQRP information element in the beacon for time slot reservations for the client device of the one of the plurality of wireless networks, wherein the NQRP information element comprises:

an address list specifying a group of devices chosen for participating in a quiet zone to transmit the RTQ message within the neighborhood quiet request period.

20. The non-transitory computer readable storage medium of claim 15, wherein the process further comprises:

detecting an incumbent signal by making a plurality of measurements during the scheduled quiet periods; and discarding a measurement of the plurality of measurements if another signal is detected during the measurement.

* * * * *